No. 637,828. Patented Nov. 28, 1899.
E. B. W. REICHEL.
SYSTEM OF ELECTRICAL DISTRIBUTION.
(Application filed Oct. 15, 1898.)
(No Model.)
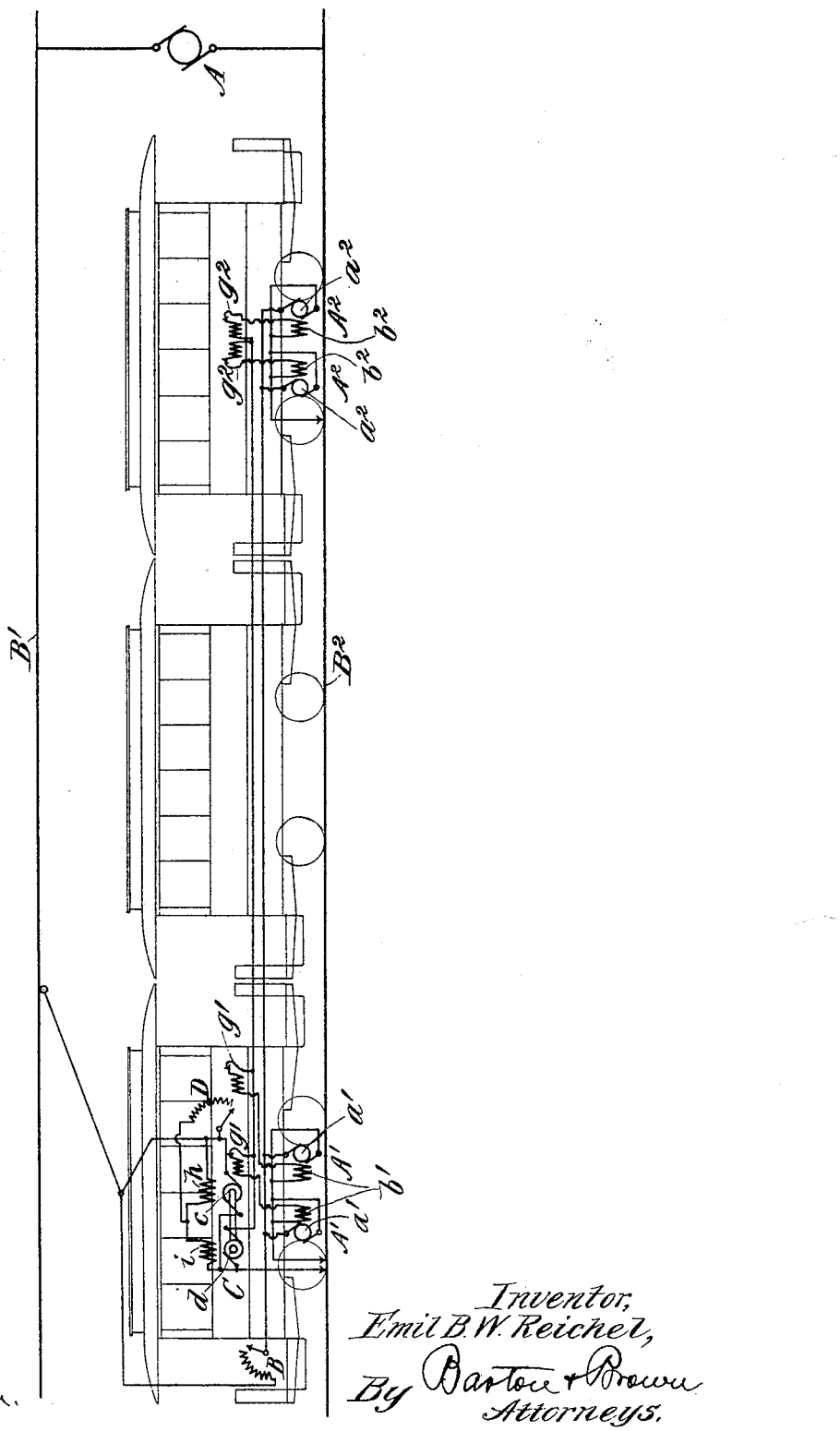
Witnesses:
Inventor,
Emil B. W. Reichel,
By Barton + Brown
Attorneys.

UNITED STATES PATENT OFFICE.

EMIL BERTHOLD WALTER REICHEL, OF BERLIN, GERMANY, ASSIGNOR TO THE SIEMENS & HALSKE ELECTRIC COMPANY OF AMERICA, OF CHICAGO, ILLINOIS.

SYSTEM OF ELECTRICAL DISTRIBUTION.

SPECIFICATION forming part of Letters Patent No. 637,828, dated November 28, 1899.

Application filed October 15, 1898. Serial No. 693,604. (No model.)

*To all whom it may concern:*

Be it known that I, EMIL BERTHOLD WALTER REICHEL, a subject of the Emperor of Germany, residing at Berlin, Germany, have invented a certain new and useful Improvement in Systems of Electrical Distribution, (Case No. 165,) of which the following is a full, clear, concise, and exact description.

My invention relates to improvements in systems of electrical distribution, and has for its object the provision of means for readily effecting the operation of a group of motors connected in said system substantially at a common or synchronous speed.

In the operation of electric cars by means of motors connected in shunt relation numerous difficulties are experienced by reason of the variability and commonly high potential of the operating-current. Furthermore, when a number of motors are employed in a group upon one or more cars additional difficulties are experienced by reason of the fact that they will ordinarily run at unequal rates of speed. My present invention overcomes the difficulties above enumerated and at the same time provides means whereby a large number of motors operated in a group may be readily controlled by a single motorman with a very simple arrangement of circuits.

In accordance with my invention the following circuit arrangements are provided: The armatures of the propelling-motors in a given group are connected through suitable controlling mechanism between the mains, while the fields are excited by a separate and independent source of current, preferably of low tension, and with each of the field-circuits a rheostat is associated which is adapted to control the individual circuits and adjust the respective motors to operate at a constant speed. In practice I have employed a rotary transformer, the motor side of which is connected in the main circuit, and, being controlled in any well-known manner, the potential of the secondary circuit is maintained at any desired value independent of any variations in the potential of the main circuit. The fields and armatures are associated in their respective circuits in shunt relation and the entire group is readily controlled by a single motorman.

My invention will be more readily understood by reference to the accompanying drawing, wherein are diagrammatically illustrated two cars to which my invention is applied.

The dynamo A indicates the main source of power, which is connected to the car-motors $A'$ $A^2$ by conductors $B'$ $B^2$. The armatures $a'$ $a^2$ are connected in the main circuit in parallel, the current passing thereto through the controller B. The field-circuits of the motors $b'$ $b^2$ are also connected in shunt relation, but are supplied with current from an independent circuit, which extends to the rotary transformer C. The motor-windings and the field of the generator of said transformer are supplied with current from the main circuit, a rheostat D being connected in shunt with the field-windings $h$ of the motor $c$, while the armature of generator $d$ is connected in circuit with the propelling-motors of the car. By means of rheostat D any desired amount of resistance may be connected in shunt with the field-windings $h$ of motor $c$, whereby the rate of rotation of said motor and the excitation of the generator are simultaneously regulated. By this means the exciting-current for the propelling-motors is readily and very economically controlled, inasmuch as the current expended in resistance D is comparatively a small proportion of the energy necessary for the excitation of motor $c$. By means of the several resistances $g'$ $g^2$, respectively associated with the individual field-circuits of the propelling-motors, the speed of said motors is readily regulated and the same may be brought to the same speed.

The circuit arrangement of my invention is very simple, involving the use of but two or three connecting-conductors between the cars, and practically any desired number of motors associated in a group may be readily controlled by means of the rheostats B and D or other suitable circuit-controlling apparatus, as desired. The connection of the fields of the motor in the manner shown is rendered entirely practical by reason of the low tension of current preferably employed for effecting the field excitation of the propelling-motors, and by reason of individual resistances $g'$ $g^2$ the speed of the several motors may readily be brought to the same speed, although otherwise varying considerably when operated in the usual manner.

Those skilled in the art will perceive that it is not necessary to employ the rotary transformer, as above indicated, for a secondary source of current, inasmuch as other suitable arrangements or means for controlling the circuit may be employed with equal efficiency.

It will be seen that my invention is readily applicable to other systems of distribution where practically the same problems arise as are met with in electric-railway practice. It is also obvious that various modifications may be made in the circuit arrangement and apparatus herein specifically referred to and illustrated without departing from the spirit of my invention.

I claim, therefore, and desire to secure by these Letters Patent, the following:

1. In a system of electric-power distribution, the combination with a main source of current, of a plurality of electric motors, the armatures of which are connected in parallel with the main source of current, a rotary transformer likewise connected with said source of current and adapted to supply a secondary circuit with a current of low potential with which the fields of said motors are connected, the fields being connected in parallel between the sides of the secondary circuit, and means for controlling the potential of the secondary circuit, substantially as described.

2. In a system of electric-power distribution, the combination with a main source of current, of a plurality of electric motors, the armatures of which are connected in parallel with the main source of current, a rotary transformer likewise connected with said source of current and adapted to supply a secondary circuit with a current of low potential with which the fields of said motors are connected, the fields being connected in parallel between the sides of the secondary circuit, resistances associated each to each with the several field-circuits of said motors, and means for controlling the potential of the secondary circuit, substantially as described.

3. In a system of electric traction, the combination with a main source of current, of a supply-circuit connected therewith extending along the line of travel, a plurality of motor-cars in a single train, a motor upon each of said cars, each comprising an armature and a field portion, the armatures of the said motors being connected in parallel with the main source of current, and a secondary source of current, the fields of the motors being in parallel with the said second source of current, substantially as described.

4. In a system of electric traction, the combination with a main source of current of high voltage, of a supply-circuit connected therewith extending along the line of travel, a plurality of motor-cars in a single train, a motor upon each of said cars, each comprising an armature and a field portion, the armatures of the said motors being connected in parallel with the main source of current, and a secondary source of current of comparatively low voltage, the fields of the motors being in parallel with the said second source of current, substantially as described.

5. In a system of electric traction, the combination with a main source of current-supply, of a supply-circuit connected therewith and extending along the line of travel, a plurality of motor-cars in a single train, a motor upon each of the said cars comprising an armature and a field portion, the armatures of the motors being connected in parallel with the main source of current-supply, a rotary transformer, the motor portion whereof is in circuit with the main source of current, the generator portion of the motor-generator and the fields of the motors upon the cars being connected in parallel, substantially as described.

6. In a system of electric traction, the combination with a main source of current-supply, of a supply-circuit connected therewith and extending along the line of travel, a plurality of motor-cars in a single train, a motor upon each of the said cars, comprising an armature and a field portion, the armatures of the motors being connected in parallel with the main source of current-supply, a rotary transformer, the motor portion whereof is in circuit with the main source of current, the generator portion of the motor-generator and the fields of the motors upon the cars being connected in parallel, the main source of current supplying current of high potential, while the generator portion of the motor-generator supplies current of comparatively low potential, substantially as described.

In witness whereof I hereunto subscribe my name this 13th day of September, A. D. 1898.

EMIL BERTHOLD WALTER REICHEL.

Witnesses:
C. H. DAY,
W. HAUPT.